United States Patent [19]

Conway et al.

[11] Patent Number: 4,753,771
[45] Date of Patent: Jun. 28, 1988

[54] PASSIVE SAFETY SYSTEM FOR A PRESSURIZED WATER NUCLEAR REACTOR

[75] Inventors: Lawrence E. Conway, Kennedy Township, Allegheny County; Terry L. Schulz, Murrysville, both of Pa.

[73] Assignee: Westinghouse Electric Corp., Pittsburgh, Pa.

[21] Appl. No.: 827,115

[22] Filed: Feb. 7, 1986

[51] Int. Cl.$^4$ .............................................. G21C 15/18
[52] U.S. Cl. .................................. 376/282; 376/283; 376/293; 376/298; 376/299
[58] Field of Search ............... 376/282, 283, 293, 298, 376/299

[56] References Cited

U.S. PATENT DOCUMENTS

| | | | |
|---|---|---|---|
| 3,207,671 | 9/1965 | Kornbichler | 376/283 |
| 3,666,616 | 5/1972 | Schluderberg | 376/283 |
| 3,929,567 | 12/1975 | Schabert et al. | 376/293 |

FOREIGN PATENT DOCUMENTS

| | | | |
|---|---|---|---|
| 568894 | 7/1958 | Belgium | 376/298 |
| 26705 | 4/1981 | European Pat. Off. | 376/282 |
| 29372 | 5/1981 | European Pat. Off. | 376/282 |
| 1564546 | 12/1969 | Fed. Rep. of Germany | 376/299 |
| 2506063 | 11/1981 | France | 376/293 |
| 302168 | 7/1968 | Sweden | 376/283 |

*Primary Examiner*—Deborah L. Kyle
*Assistant Examiner*—Richard W. Wendtland
*Attorney, Agent, or Firm*—D. C. Abeles

[57] ABSTRACT

A passive safety system for a nuclear reactor is comprised of a first subsystem for circulating water solely by natural convection from a first branch to a second branch of a reactor coolant circuit with the circumvention of a steam generator for removing decay heat from the reactor coolant circuit at any pressure. The first branch guides heated water from the reactor vessel into the steam generator and the second branch guides cooled water from the steam generator into the reactor vessel. The first subsystem includes a heat exchanger for cooling water flowing from the first branch and prior to being introduced into the second branch and a first valve for allowing flow of water from the first branch into the second branch solely in response to a parameter value pertaining to operational safety. There is also provided a second subsystem for introducing stored cold water solely by gravity into the reactor vessel for making up for lost water in the reactor coolant circuit at any pressure. The second subsystem includes a valve for allowing the stored cold water to be introduced into the reactor vessel solely in response to a parameter value pertaining to operational safety. The passive safety system further has a third subsystem for introducing stored cold water solely by gravity into the reactor vessel when the pressure within the reactor coolant circuit is reduced at least approximately to the same pressure as in the containment, for flooding the containment to a height above the first and second branches of the reactor coolant circuit. The third subsystem includes a valve for depressurizing the reactor coolant circuit in response to a parameter value pertaining to operational safety.

17 Claims, 3 Drawing Sheets

PASSIVE SAFETY SYSTEM FOR A PRESSURIZED WATER NUCLEAR REACTOR

BACKGROUND OF THE INVENTION

1. Field of the Invention

This invention pertains to the field of nuclear reactors, particularly of the pressurized water type and is concerned with the fluid systems important to safety which mitigate the consequences of any postulated event as required by the Federal Code of Regulations, Title 10. Specifically, these systems provide emergency cooling of the reactor core, reactor building heat removal and pressure reduction, and reactor building fission product control. These fluid systems in conjunction with specific plant layout considerations together with other equipment typical in current reactor plant designs comprise the engineered safeguards features of the nuclear reactor. This invention does not specifically consider those portions of the engineered safety features which are related to the control rods or to instruments and associated electrical components which monitor reactor operation or provide signals for actuation of the engineered safety features although their use is assumed and utilized in the application of these fluid systems.

These fluid systems important to safety in a nuclear reactor stand by to perform the basic functions of heat removal and water inventory control for "events" which result due to failure of normally operating components or systems or result in a situation where necessary compensation lies beyond the capacity or capability of the systems designed for the normal reactor operation. Typical of such events are cracks or breaks at any location of the primary cooling water circuit which may range from a hairline crack in a small pipe to a "guillotine" break in a main pipe, causing water losses which may range from slow leaks to cascading outflows from the primary circuit onto the containment floor. Accordingly, the intensity and rapidity of the development of heat to be removed or coolant to be resupplied may vary greatly dependent on the rate of coolant loss.

These systems important to safety are designed to automatically initiate and perform measures commensurate with the seriousness of the "event", in accordance with established Federal regulations and nuclear industry standards.

2. Description of the Prior Art

Conventional safety systems that are employed in pressurized water reactors are typically dependent on a large number of "active" components such as pumps and fans which have the capability to be powered by emergency diesel engines and associated electrical power systems should off-site power not be available. Thus, for example, assuming a large pipe break in the coolant system, termed as a "loss of coolant accident", water is introduced into the primary circuit and thus the reactor vessel by safety systems comprised of pumps. Further, the containment heat-up is counteracted by pump-operated spraying devices and also, heat from the containment is removed by motor-driven fan coolers. The reactor decay heat and heat from the containment is transferred into an emergency cooling water system which also utilizes pumps. Additional active "safety grade" systems are also required for other safety functions and include an emergency steam generator feed water system as well as ventilating and air conditioning arrangements for cooling these active components. These safety systems are all required to be redundant in order that the failure of any single component will not result in the loss of a safety function. Also, to assure the operation of active components in safety systems, nuclear power plants have required physical separation for fire and flood protection between redundant trains of equipment. This approach to nuclear plant safety results in plant designs which are highly complex and expensive, requiring significant testing, construction and operational efforts associated with direction, maintenance and quality assurance.

SUMMARY OF THE INVENTION

It is an object of the invention to provide, for a nuclear reactor, particularly of the pressurized water type, a safety system which is characterized by the absence of any "active" component for driving fluid to effect heat removal and water make-up and which performs all necessary safety functions, namely, the supply or injection of water into the reactor coolant system and heat removal in sequential phases dependent upon development, course and degree of conditions which require correction by the safety system. Also, this safety system will provide for alternate heat removal from the reactor containment to the environment, containment pressure reduction and reduction of containment atmosphere fission product concentration.

These objectives and others to become apparent as the specification progresses, are accomplished by the invention, according to which, briefly stated, a passive safety system for a nuclear reactor is comprised of a first subsystem for circulating water solely by natural convection from a first branch to a second branch of a reactor coolant circuit with the circumvention of a steam generator for removing decay heat from the reactor coolant circuit at any pressure. The first branch guides heated water from the reactor vessel into the steam generator and the second branch guides cooled water from the steam generator into the reactor vessel. The first subsystem includes a heat exchanger for cooling water flowing from the first branch and prior to being introduced into the second branch and a valve for allowing flow of water from the first branch into the second branch solely in response to a parameter value pertaining to operational safety. There is also provided a second subsystem for introducing stored cold water solely by gravity into the reactor vessel for making up for lost water in the reactor coolant circuit at any pressure. The second subsystem includes a valve for allowing the stored cold water to be introduced into the reactor vessel solely in response to a parameter value pertaining to operational safety. The passive safety system further has a third subsystem for introducing stored cold water solely by gravity into the reactor vessel when the pressure within the reactor coolant circuit is reduced at least approximately to the same pressure as in the containment, for flooding the containment to a height above the first and second branches of the reactor coolant circuit. The third subsystem includes a valve for depressurizing the reactor coolant circuit in response to a parameter value pertaining to operational safety. A fourth subsystem removes heat from the containment by natural air circulation externally of and in contact with the entrainment shell.

DESCRIPTION OF THE PREFERRED EMBODIMENT

Figure 1:
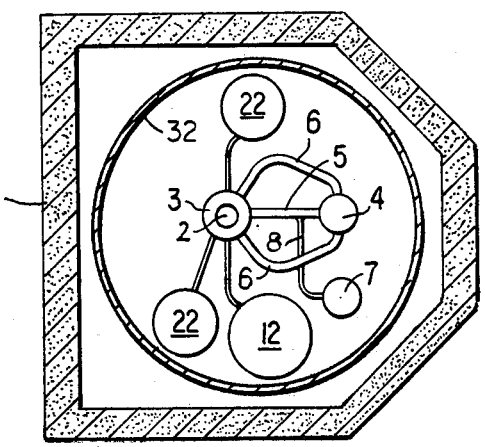
FIG. 1 is a schematic top plan view of a nuclear reactor containment, illustrating components of a preferred embodiment of the invention.

Turning to FIG. 1, there is schematically illustrated a shield building 1 in horizontal section, showing components of the nuclear reactor as well as the system according to the invention. A reactor core 2 accommodated in a reactor vessel 3 continuously heats water circulating in a primary water circuit forming part of the reactor cooling system. The water heated in the reactor core 2 is supplied to a steam generator 4 through a hot leg 5 of the loop piping of the primary water circuit. The hot leg 5 extends from the reactor vessel 3 to the steam generator 4 in which heat is taken us by the water circulating in a secondary water circuit (not shown). After the heat exchange in the steam generator 4 water is withdrawn therefrom through the cold leg 6 of the loop piping of the primary water circuit and is reintroduced into the reactor vessel 3. A pressurizer 7 communicating with the hot leg 5 by means of a pipe 8 maintains the required pressure in the primary coolant circuit.

Figure 2:
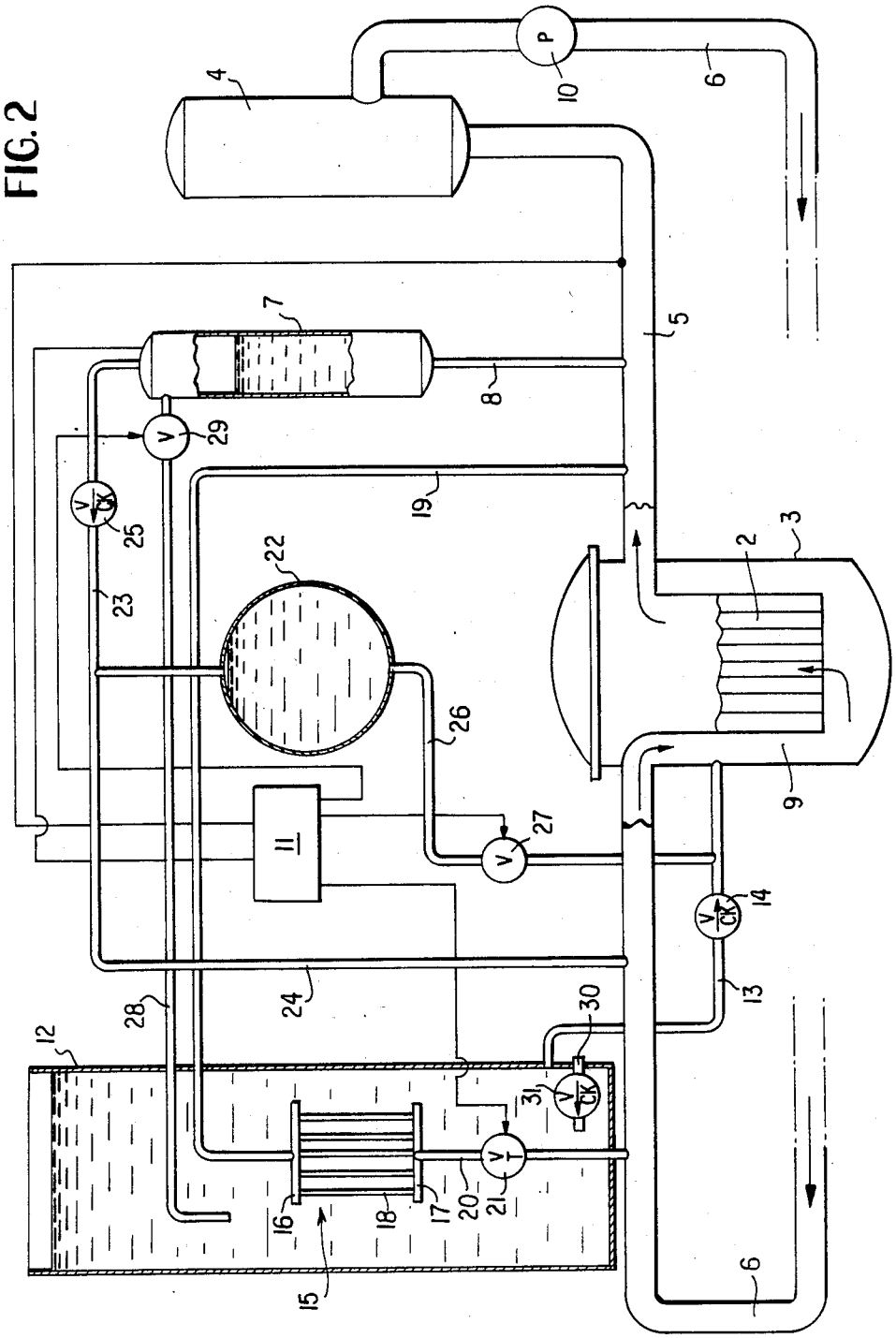
FIG. 2 is a schematic diagrammatic view of the preferred embodiment.

Also referring to FIG. 2, as the water enters the reactor vessel 3 from the cold leg 6, it is directed downwardly within the reactor vessel 3 to flow to the bottom thereof through a downcomer 9. Therefrom the water is forced upwardly through the reactor core 2 and it eventually leaves the reactor vessel 3 in a heated condition through the hot leg 5 as described above. The water in the primary circuit (that is, the reactor coolant system) is maintained in circulation by reactor coolant pumps 10 (only one shown).

The above-specified reactor components, their arrangement and operation are well known with the exception of the reactor coolant pump arrangement which is further discussed below. Also conventionally, parameters such as temperatures, water levels, pressures, etc. in and along the various components are routinely sensed in a continuous manner by known sensor and recording and/or display systems. Such conventional parameter sensing systems are symbolically designated at 11.

With particular reference to FIG. 2, the essential components of a preferred embodiment of the passive safety system according to the invention will be set forth. It is noted that the decription which follows and the illustration pertaining thereto present the construction in a simplified manner for clarity and thus, for example, omit a discussion and illustration of redundant components generally required in nuclear reactor safety systems. It is further noted that the given exemplary dimensional values are approximations only, based on a 45 MW thermal pressurized water reactor.

An open-top in-containment water storage tank 12 is situated in the shield building 1 such that a substantial portion of its volume is situated above the level of the reactor coolant system piping, that is, above the height level of the hot leg 5, the cold leg 6 and the water path within the reactor vessel 3. Thus, the storage tank 12 may have a total height of 11 m and its bottom may be about 2.5 m lower than the top of the reactor vessel 3. The storage tank 12 has the shape of an upright cylinder having an inner diameter of 3 m and thus has a capacity of 78 m$^3$. The storage tank 12 is connected with the downcomer 9 of the reactor vessel 3 by a pipe 13 maintained closed by a check valve 14 as long as smaller pressure prevails at the tank side of the check valve 14 than at its downcomer side.

The in-containment water storage tank 12 accommodates a passive residual heat removal heat exchanger generally designated at 15 which has a height of 6 m and which is secured to the inner wall of the storage tank 12 about 2 m above the bottom of the storage tank 12. Thus, the heat exchanger 15 is normally totally submerged in the water stored in the storage tank 12 and is situated at an elevation above the coolant loop piping of the reactor. The cold water in the storage tank 12 thus functions, with respect to the heat exchanger 15, as an initial heat sink.

Figure 3:
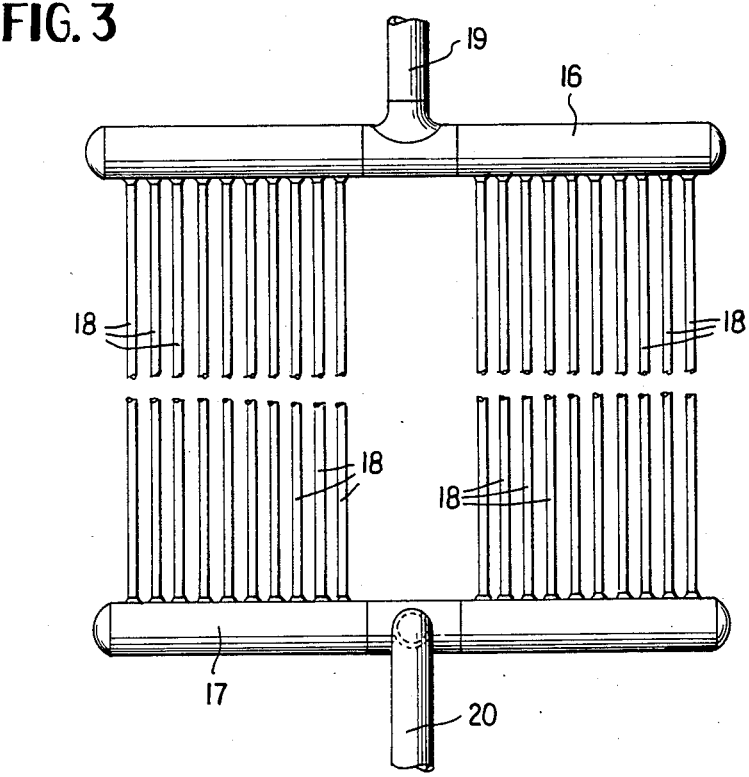
FIG. 3 is a schematic side elevational view of a component of the preferred embodiment.

The structure of the heat exchanger 15 is illustrated in detail in FIG. 3. The heat exchanger 15 has at the top a horizontal intake manifold 16 and at the bottom a horizontal outlet manifold 17. The inlet manifold 16 communicates with the outlet manifold 17 by means of a plurality of heat exchanger tubes 18 (for example, twenty in number) each having a diameter of 2 cm and arranged in a parallel series along the length of the manifolds 16 and 17. This construction renders the heat exchanger 15 highly resistant to thermal stresses and further, permits easy accessibility for inspection and maintenance.

Turning once again to FIG. 2, the inlet manifold 16 is connected with the hot leg 5 of the reactor cooling system by a pipe 19 which continuously rises from the hot leg 5 at least to the level of the intake manifold 16 and then may extent horizontally theretowards. The outlet manifold 17 of the heat exchanger 15 is connected with the cold leg 6 of the reactor cooling system by a downwardly extending pipe 20 which is blocked by a normally closed, fail-open throttle valve 21 responding to conditions as will be described later. Both pipes 19 and 20 may have a diameter of 8 cm. Valve 21 provides the capability for regulating the flow rate through the pipe 20, for example, from the parameter sensing systems 11.

Above the height level of the reactor coolant system piping 5 and 6, there are provided two spherical core make-up tanks 22 (both shown in FIG. 1, but only one shown in FIG. 2). Each core make-up tank 22 has a capacity of 7 m$^3$. The pipe connections pertaining to only one of the core make-up tanks 22 will be described, while it is understood that identical duplicate piping is used for the other core make-up tank 22 to provide for a redundancy.

The top of the inside space of the cold water filled core make-up tank 22 communicates with the steam space of the pressurizer 7 by means of a relatively small-diameter (for example, 5 cm) pipe 23. Further, the upper space of the core make-up tank 22 is connected with the cold leg 6 by a pipe 24 of relatively large diameter (for example, 10 cm). A check valve 25 is arranged in the pipe 23 for preventing flow of fluid through the pipe 23 in the direction of the pressurizer 7. The bottom of the core make-up tank 22 is connected with the downcomer 9 of the reactor vessel 3 by a pipe 26 which is normally closed by means of a fail-open isolation valve 27 responding to conditions of be described later.

From the steam space of the pressurizer 7 there extends a depressurizing pipe 28 which opens into the in-containment water storage tank 12 and which is maintained normally closed by a power operated pressure relief valve 29 responding to conditions to be described later.

The in-containment water storage tank 12 is, at its lower part, provided with an outlet nipple 30 which is normally maintained closed by a check valve 31 which prevents outflow of water from the in-containment water storage tank 12 but permits—as will be described below—water flow from the flooded containment into the storage tank 12.

Figure 4:
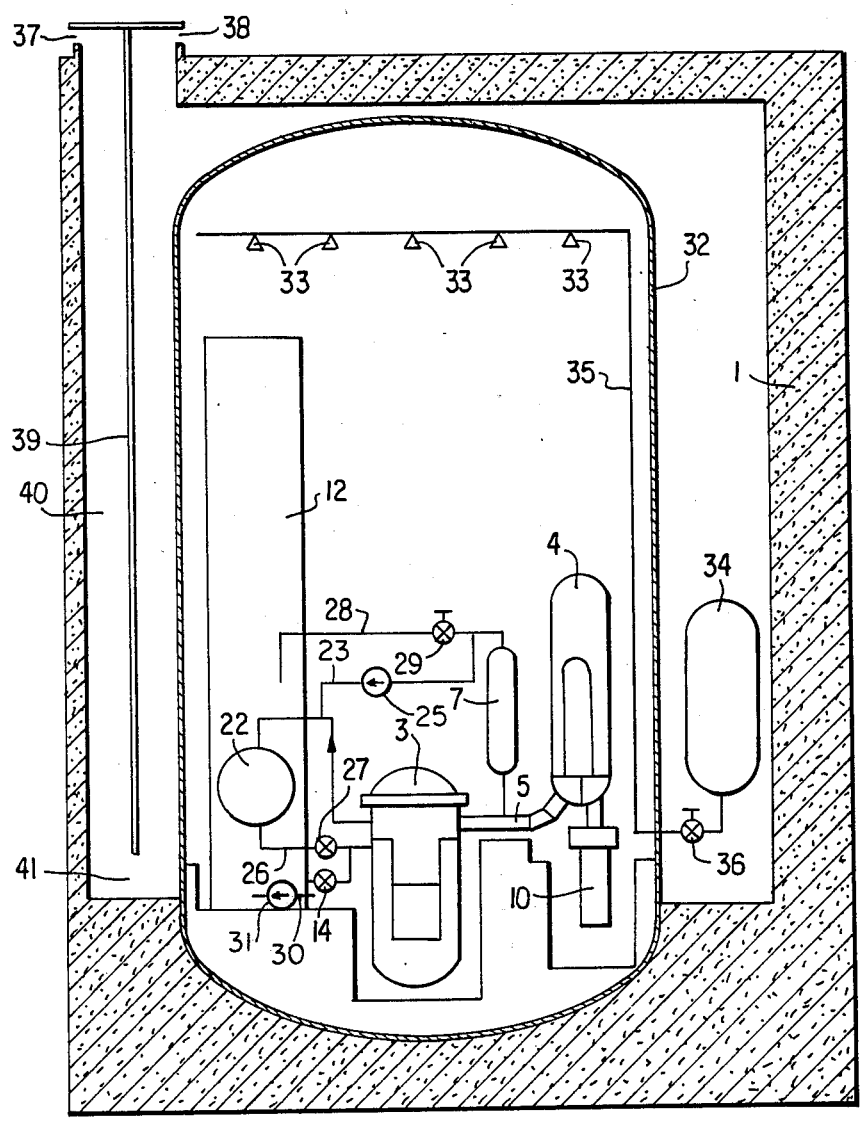
FIG. 4 is a schematic sectional side elevational view of the reactor containment, illustrating further components of the preferred embodiment.

The piping arrangement (pipes 23, 26 and 24) are shown for the preferred embodiment which includes the specific reactor coolant pump 10 shown in FIG. 4. The reactor coolant pump 10 is vertically oriented, with the pump motor below the pumping impeller and casing. This arrangement is preferred to eliminate any piping loop between the steam generator 4 and the inlet to be reactor coolant pump 10.

Turning to FIG. 4, there is schematically shown, in elevational section, the containment shield building 1 accommodating a cylindrical metal containment shell 32 (also shown in FIG. 1) enclosing most of the volume of the inner space of the shield building 1 and defining an annular space with the inside walls of the shield building 1. Thus, the shell 32 houses all the components of the reactor and the safety system described above. For the sake of clarity only some of these components are shown in FIG. 4.

A plurality of water spray heads 33 are distributed inside the containment shell 32 in an upper portion thereof. The spray heads 33 are connected with a containment spray accumulator tank 34 by a pipe 35. The tank 34 is situated in the annular space surrounding the containment shell 32 and is partially filled with water, while the space above the water level contains a pressurized gas, for example, $N_2$. The pipe 35 is maintained normally closed by a power operated shutoff valve 36 responding to conditions to be decribed below.

It is currently required by the Nuclear Regulatory Commission that following the occurrence of a serious pipe break in the reactor coolant system, consideration be given to a quantity of fission gases assumed to be released into the containment shell. In response to such a requirement, typically active containment spray pumps have been installed which disperse water into the containment shell via spray heads. This function is provided in the passive safety system according to the invention by the containment spray accumulator tank, the pipe 35, the normally closed valve 36 and spray heads 33. The valve 36 is automatically opened when the pressure in the containment shell exceeds a predetermined set point. When the valve 36 is opened, water will be driven to the spray heads 33. The containment spray accumulator tank 34 is a right cylindrical tank with hemispherical heads with a total volume of 22.5 $m^3$, and provides sufficient spray flow for a sufficient period of time to provide sufficient fission product removal from the volume of the containment shell 32.

The functions of the passive safeguards system described above encompass the functions required to be performed for all expected and/or postulated events affecting the primary reactor coolant system. Other safety grade features would be required to perform such functions as automatic isolation of the containment and automatic isolation of the steam generator feed line(s), steam line(s) and blowdown line(s) in response to the events described below or events not described herein such as a steam generator tube rupture.

Apertures are provided through the shield building 1 to serve as an air inlet 37, which permits air to enter into the bottom of the shield building 1 and an air outlet 38 which permits air to exit from the top of the shield building. The air inlet 37 is illustrated in FIG. 4 at the top of the shield building with a duct, shown as a partition 39 to define an air inlet shaft 40 which, at the bottom of the shield building 1, communicates at 41 with the annular space surrounding the containment shell 32. This arrangement provides for a natural air circulation by allowing hot air surrounding the containment shell 32 to vent into the atmosphere through the air outlet 38, aided in its upward drive by cold air drawn in by natural circulation through the air inlet 37 and flowing down in the air inlet shaft 40. The air inlet and outlet 37, 38 may be continuously open as shown, or may be normally closed by a damper mechanism which drops into an open position, for example when a damper lock receives a signal representing a predetermined temperature level in the containment shell 32.

Another safety grade feature provided to complete the passive safeguards system is the passive removal of heat from the spent fuel pit (not shown). Spent fuel pit head removal may be accomplished using air ducts similar to components 37, 38, 39, 40, in conjunction with a double-walled or jacketed spent fuel pit which would permit the natural circulation of air around the spent fuel pit.

In the description which follows, the operation of the above-described passive safety system will be set forth, with particular reference to FIGS. 2 and 4.

During normal operation, the passive safety system according to the invention is in a non-functioning, standby state: the in-containment water storage tank 12 as well as the core make-up tanks 22 are full with "cold" water. The storage tank 12, being open at the top, is thus maintained at containment pressure within the containment shell 32, whereas the core make-up tanks 22 are maintained at the reactor coolant system pressure by means of the pipes 23 and 24, each connected with the core make-up tank 22 and with the reactor coolant system circuit. The isolation valves 21 and 27 as well as the power operated pressure relief valve 29 are maintained closed by active means (for example, by respective energized solenoids). The check valve 14 blocks the pipe 13 because of the greater pressure in the reactor coolant system than in the in-containment water storage tank 12. The loop formed of pipes 19 and 20 and the heat exchanger 15 are filled with water which is in a static state and is at reactor coolant system pressure. Heat is removed from within the containment shell 32 (assuming that the cooling air ducts arranged at the air inlet 37 and air outlet 38 are closed by a damper, not shown) by non-safety related fan coolers (also not shown) located inside the containment shell 32).

Similarly, following a plant trip (reactor shut-down), no actuation of the passive safety system according to the invention will occur as long as the normally available systems provide for a sufficient decay heat removal from the reactor coolant system via the steam generator 4, and the reactor coolant system water inventory is maintained by the usual chemical and volume control system make-up pumps.

Should, for example, the steam generator 4 not provide for the sufficient heat removal, the temperature in the hot leg 5 increases. When such a temperature exceeds a predetermined value, the fail-open isolation valve 21 contained in the pipe 20 is de-energized upon a signal from the parameter sensing system 11, thus causing opening of the valve 21. Assuming a standstill of the reactor coolant pumps 10 a natural circulation of water through the heat exchanger 15 begins: the hot water in the pipe 19 rises and is introduced into the heat exchanger 15 while cooled water from the heat exchanger 15 flows through the now-open pipe 20 into the cold leg 6. Such a natural water circulation is effected by the different water densities in the pipes 19 and 20. Thus, the heat exchanger 15 transfers heat from the reactor coolant system to the water (initial heat sink) contained in the storage tank 12. In case the valve 21 opens while the reactor coolant pump 10 is still running, then a forced circulation of water will take place through the pipe 20 up into the heat exchanger 15 and therefrom through the pipe 19 into the hot leg 5. This occurrence also effects heat transfer from the reactor coolant system to the water in the storage tank 12 by means of the heat exchanger 15. The flow rate of water flowing through the heat exchanger 15 may be controlled (particularly in case of a reversed, forced circulation from the cold leg to the hot leg) by regulating the throttle valve 21 from the parameter sensing system (for example, from the main control panel) 11.

As the heat exchange process between the heat exchanger 15 and the water in the in-containment water storage tank 12 is in progress, the water volume in the tank 12 is sufficient to prevent steaming from the tank 12 into the containment for hours. During this time, restoration of decay heat removal from the reactor coolant system by the steam generator 4 or initiation of heat removal using the cooling function, for example, of an active (pumped) heat removal cooling system (not shown) may restore the plant to the normal (non-safety) cooling mode. It is contemplated that if the steam generator 4 or the spent fuel pit cooling system are not available or capable of restoring the plant to the normal cooling mode, continued steam from the in-containment water storage tank 12 will ensure reactor coolant system heat removal for a longer period (days) and may transfer heat from the reactor coolant system to the environment through the containment shell 32 with the opening of air inlet and outlet ducts 37 and 38 (in case they are not normally open) to permit natural circulation of the air into and out of the annulus between the containment shell 32 and the shield building 1, cooling the steel walls of the containment shell.

The provision of the heat exchanger 15 in the primary reactor coolant system and the provision for heat removal from the containment shell 32 by natural circulating air eliminate the need for the typical safety grade residual heat removal systems of commercial pressurized water reactors, such as multiple steam generators, a safety grade emergency feed water system, safety grade fan coolers, a conventional safety grade residual heat removal system, a safety grade component cooling water system and a safety grade essential service water system. Also, since no active pumps are required to perform the function of safety grade heat removal, there is no need for supporting emergency diesels as well as heating, ventilating and air conditioning arrangements.

Let it be assumed now that a minor leak has developed in the reactor coolant system and the normal non-safety reactor coolant system make-up is not available, for example, because of a failure of the normal make-up pumps or a loss of electric power. The passive safety system according to the invention will now supply the reactor coolant system with water from the core make-up tanks 22 in a manner as follows: the leak will cause a slow, gradual drop of the liquid level in the pressurizer 7. When such level falls below a predetermined value, the reactor will be shut down. Should the liquid level in the pressurizer 7 continue to fall, the fail-open isolation valve 27 is de-energized upon signal from the parameter sensing system 11, thus opening the pipe 26. At the same time, the reactor coolant pumps 10 are de-energized. Since the level of water in the full core make-up tank 22 is higher than the water level in the pressurizer 7, water from the core make-up tank 22 may flow by gravity through the pipe 26 into the downcomer 9 of the reactor vessel 3. This occurrence will tend to restore the pressurizer water level to above its predetermined level associated with the opening of the isolation valve 27. This gravity drain of the core make-up tank 22 is accomplished by steam from the steam space of the pressurizer 7 flowing to the top of each core make-up tank 22 whereby the pressure there will equal that of the pressurizer 7. Core decay heat continues to be removed either by natural circulation of the reactor coolant through the steam generator 4 or through the heat exchanger 15. Removal of the heat from the containment continues by normal containment fan coolers. Should these fans fail, the containment temperature slowly rises. After several hours the air ducts leading to and from the containment annulus surrounding the shell 32 open (in case a normally closed damper is provided) to establish containment cooling by natural air circulation into and out of the air inlet and outlet openings 37 and 38, respectively, as discussed previously.

Thus, assuming a minor leak, the described activation of the core make-up tanks 22 and related normal measures should re-establish and maintain the water in the reactor coolant system as well as the removal of decay heat at the required levels.

As noted earlier, simultaneously with the de-energization (and thus opening) of the isolation valve 27 the reactor coolant pumps 10 are shut down. If the isolation valve 27 is opened by a spurious signal (thus, while the reactor coolant pumps 10 are running), then the water level in the pressurizer 7 will be higher than the level in the core make-up stands 22 and thus no injection of the water from the core make-up tanks 22 into the downcomer 9 of the reactor vessel 3 will occur and also, a forced reverse circulation from the downcomer 9 through the pipe 26 into the core make-up tank 22 and down the pipe 24 into the cold leg 6 is minimized because the pressure difference between the location where the pipe 26 opens into the downcomer 9 and the location where the pipe 24 opens into the cold leg 6 is very small.

It is now assumed that a serious pipe break has occurred in the reactor coolant system ("loss of coolant accident"), for example, a "guillotine" break in the loop pipe of the reactor cooling system. Such an event is characterized by a very rapid draining of the water from the reactor coolant system through the break onto the floor of the containment shell 32. This is accompanied by a pressure drop in the reactor coolant system which initiates a reactor trip and, at the same time, opens the valves 21 and 27. The water level in the reactor coolant system will drop by loss through the break and will fall below the level of the reactor coolant system loop piping, particularly the hot leg 5 and the cold leg 6. This occurrence will cause saturated steam to enter from the cold leg 6 through the pipe 24 into each core make-up tank 22 effecting a large flow rate in the pipe 26 discharging water into the downcomer 9 by gravity. It is noted that each core make-up tank 22 can provide an initial water injection at a rate of about 20 l/sec which, as the core make-up tanks empty, decreases to about 10 l/sec. As the water level in either core make-up tank 22 drops below a predetermined level, the parameter sensing system 11 applies a signal to the pressure relief valve 29, whereby the relief pipe 28 opens and thus establishes communication between the steam space of the pressurizer 7 and the containment shell 32 (with the intermediary of a portion of the water in the in-containment water storage tank 12). This occurrence assures that the reactor coolant system is depressurized to the extent that the pressure in the reactor coolant system is less than the pressure at the bottom of the in-containment water storage tank 12 (i.e. the containment pressure plus waterhead above the discharge point of line 28 in tank 12). This condition will allow flow of water from the in-containment water storage tank 12 through the pipe 13 and the check valve 14, into the downcomer 9. Thus, for this phase of the operation, the relatively large volume of water of the in-containment water storage tank 12 is utilized to provide continued flow into the reactor coolant system before the relatively limited volume of the core makeup tank 22 is depleted. This relatively large volume of water in the storage tank 12 may also directly flood the containment via the break in the reactor coolant system. The floor configuration of the containment shell 32 as well as the volume of the water in the in-containment water storage tank 12 are so coordinated with one another that the water volume passing through the pipe 13 is sufficient to floor the containment shell 32 above the level of the reactor coolant system piping and above the piping inlet 30 into the in-containment water storage tank 12.

After the core make-up tanks 22 and the in-containment water storage tank 12 have emptied their water content as described above, conditions for the long-term cooling mode of operation are established: the reactor core 2 is covered with water which steams into the containment shell 32 through the break and/or the relief pipe 28. The steam is condensed on the containment steel shell 32 which is cooled by air circulation through the containment annulus via the air inlet and outlet 37 and 38. The condensed water within the shell 32 is returned to the floor of the containment shell 32, whereby water level is maintained therein above the reactor coolant system loop piping 5 and 6. Such water level is sufficiently higher than the water remaining in the in-containment water storage tank 12, thus causing water to flow from the floor of the containment shell 32 into the tank 12 through the check valve 31 and the nipple 30 provided in the wall of the water tank 12 and subsequently to flow from the tank 12 into the reactor core 2 through the pipe 13. The water in the containment shell floor may also be returned to the core 2 directly through the break in the reactor coolant system if it is below the water level established on the containment shell floor.

The provision of the core make-up tanks 22 in the reactor coolant system eliminates the need for safety grade injection pumps (high pressure or low pressure pumps) typically provided in present day commercial pressurized water reactors as well as safety grade equipment required for support such as emergency diesel generators, cooling water systems, as well as heating ventilation and air conditioning arrangements. It is further noted that delivery of water from the core make-up tanks 22 into the downcomer 9 of the reactor vessel 3 is insensitive to the break location, because the pressure difference between the location where water is injected into the downcomer 9 from the core make-up tanks 22 and the location of connection in the cold leg 6 with the pipe 24 is always very small.

It is thus seen that any transient event and/or accident in the nuclear reactor which requires removal of decay heat or causes coolant water losses are compensated for by the passive safety system which supplies the necessary water either by gravity or by natural circulation, thus entirely without the aid of active components such as pumps. Similarly, the removal of heat from the containment is effected by natural circulation or fan-less spray drives in several stages dependent upon the seriousness of the conditions.

It will be understood that the above description of the present invention is susceptible to various modifcations, changes and adaptations, and the same are intended to be comprehended within the meaning and range of equivalents of the appended claims.

What is claimed is:

1. In a nuclear reactor including a shield building, a heat-conducting containment shell situated in the shield building and defining an annular space therewith surrounding said containment shell, a reactor vessel situated in the containment shell, a steam generator situated in the containment shell, a reactor coolant circuit having a first branch guiding heated water from said reactor vessel into said steam generator and a second branch guiding cooled water from said steam generator into said reactor vessel; a reactor coolant pump connected to said reactor coolant circuit for maintaining circulation of water therein, and a pressurizer connected to said reactor coolant circuit for maintaining the water therein at predetermined pressures; the improvement comprising a passive safety system including (a) first means for circulating water solely by natural convection from said first branch to said second branch with the circumvention of said steam generator for removing decay heat from said reactor coolant circuit at any pressure; said first means including
 (1) a heat exchanger means for cooling water flowing from said first branch and prior to being introduced into said second branch; said heat exchanger means including
  (i) a water storage tank situated in said containment shell and holding cooling water; said water storage tank being upwardly open toward the containment space surrounded by said containment shell for allowing vapor and steam to freely rise from the water storage tank into the containment space; and
  (ii) a heat exchanger disposed in the water storage tank and being formed of a piping in which water from the reactor coolant circuit flows and which is contacted externally by the cooling water contained in the water storage tank;
 (2) first valve means for allowing flow of water from said first branch into said second branch solely in response to a parameter value pertaining to operational safety;
(b) second means for introducing stored cold water solely by gravity into said reactor vessel for making up for lost water in said reactor coolant circuit at any pressure; said second means including second valve means for allowing the stored cold water to be introduced into said reactor vessel solely in response to a parameter value pertaining to operational safety;
(c) third means for introducing stored cold water solely by gravity into said reactor vessel when the pressure within the reactor coolant circuit is reduced at least approximately to the same pressure as in the containment shell, for flooding the containment shell to a height above said first and second branches of said reactor coolant circuit; said third means including third valve means for depressurizing said reactor coolant circuit in response to a parameter value pertaining to operational safety; and
(d) fourth means for effecting a heat exchange contact in said annular space between a fluid and said containment shell to remove heat from said containment shell solely by natural circulation of said fluid.

2. A nuclear reactor as defined in claim 1, wherein said fourth means includes means for guiding cold air in said annular space to descend from an upper part of said shield building solely by natural circulation to a bottom part thereof for contacting said containment shell at said bottom part and for guiding air in said annular space to rise from said lower part solely by natural circulation along and in heat exchanging contact with said containment shell and to exit said shield building at an upper part thereof.

3. A nuclear reactor as defined in claim 1, further comprising
(e) a plurality of spray heads supported in an upper part of said containment shell;
(f) a containment spray accumulator tank containing a pressurized spraying liquid;
(g) conduit means connecting said containment spray accumulator tank with said spray heads; and
(h) a shutoff valve contained in said conduit means and arranged to open in response to a parameter value pertaining to operation safety.

4. In a nuclear reactor including a shield building, a heat-conducting containment shell situated in the shield building and defining an annular space therewith surrounding said containment shell, a reactor vessel situated in the containment shell and accommodating a reactor core; a steam generator situated in the containment shell; a loop piping connecting the reactor vessel with the steam generator and having a hog leg guiding heated water from the reactor vessel into the steam generator and a cold leg guiding cooled water from the steam generator into a downcomer of the reactor vessel; a reactor coolant pump maintaining circulation of water through said core, said steam generator and said loop piping; said loop piping, said downcomer and water passages in said reactor vessel and said steam generator defining a reactor coolant circuit; and a pressurizer connected to said loop piping for maintaining the water in the reactor coolant circuit at predetermined pressures; said pressurizer having a steam space; the improvement comprising a passive safety system including (a) an in-containment water storage tank situated in said containment shell and having a storage space, a substantial part of which being situated above a top height level of said loop piping and said reactor core; said in-containment water storage tank being designed to hold an amount of water sufficient to flood the containment shell above said loop piping and said reactor core; said in-containment water storage tank being upwardly open toward the containment space surrounded by said containment shell for continuously maintaining said in-containment water storage tank at containment pressure and for allowing vapor and steam to freely rise from the in-containment water storage tank into the containment space;
(b) a first pipe connecting a lower part of the storage space of said in-containment water storage tank with said downcomer;
(c) a check valve contained in said first pipe allowing water flow by gravity from the in-containment water storage tank into the downcomer solely when pressure in the downcomer is substantially at containment pressure;
(d) a heat exchanger situated in the in-containment water storage tank above the top height level of said loop piping and said reactor core; said heat exchanger having an upper part including an inlet and a lower part including an outlet; said heat exchanger being normally submerged in water
(e) a second pipe connecting said hot leg with said inlet of said heat exchanger;
(f) a third pipe connecting said outlet of said heat exchanger with said cold leg;
(g) a first isolation valve contained in said third pipe and arranged to open in response to a parameter value pertaining to operational safety for allowing circulation of water, by convection, through said second and third pipes and said heat exchanger;
(h) a core make-up tank situated in said containment shell above the top height level of said loop piping and said reactor core and above a predetermined low water level in said pressurizer; said core make-up tank having an upper part and a lower part;
(i) a fourth pipe connecting the steam space of said pressurizer with said upper part of said core make-up tank for allowing steam to flow from said steam space into the upper part of said core make-up tank;
(j) a fifth pipe connecting said cold leg with said upper part of said core make-up tank to permit steam to flow from said cold leg into the upper part of said core make-up tank;
(k) a sixth pipe connecting said lower part of said core make-up tank with said downcomer;
(l) a second isolation valve contained in said sixth pipe and arranged to open in response to a parameter value pertaining to operational safety for allowing flow of water by gravity from said core make-up tank into said downcomer;
(m) a pressure relief valve operatively connected with said steam space of said pressurizer and arranged to open in response to a parameter value pertaining to operational safety for depressurizing said reactor coolant circuit substantially to containment pressure; and
(n) means for effecting a heat exchange contact in said annular spcae between a fluid and said containment shell to remove heat from said containment shell solely by natural circulation of said fluid.

5. A passive safety system as defined in claim 4, further comprising
(o) a plurality of spray heads supported in an upper part of said containment shell;
(p) a containment spray accumulator tank containing a pressurized spraying liquid;
(q) conduit means connecting said containment spray accumulator tank with said spray heads; and
(r) a shutoff valve contained in said conduit means and arranged to open in response to a parameter value pertaining to operational safety.

6. A passive safety system as defined in claim 4, wherein said means for effecting a heat exchange contact comprises
(a) means defining an air inlet opening and an air outlet opening in an upper part of said shield building for communication with said annular space surrounding said containment shell; and
(b) a vertical partition disposed in said annular space; said partition separating said air inlet opening from said air outlet opening and defining an air inlet shaft extending to a lower part of said annular space for guiding air, entering through said air inlet opening, downwardly into said lower part of said annular space for external contacting said containment shell.

7. A passive safety system as defined in claim 4, wherein said heat exchanger comprises
(a) a generally horizontally oriented inlet manifold connected directly with said second pipe;
(b) a generally horizontally oriented outlet manifold connected directly with said third pipe; and
(c) a plurality of generally vertically oriented heat exchange tubes arranged in a parallel spaced array and each being connected, at opposite ends, to said inlet manifold and said outlet manifold.

8. A passive safety system as defined in claim 4, wherein said fifth pipe has a greater inner diameter than said fourth pipe.

9. A passive safety system as defined in claim 8, wherein the inner diameter of said fifth pipe is twice the dimension of the inner diameter of said fourth pipe.

10. A passive safety system as defined in claim 4, wherein said first isolation valve includes means for controlling a flow rate in said third pipe.

11. A passive safety system as defined in claim 4, further comprising a pressure relief pipe connecting the steam space of said pressurizer with said storage space of said in-containment water storage tank; said pressure relief valve being contained in said pressure relief pipe.

12. A passive safety system as defined in claim 4, wherein said check valve is a first check valve; further comprising a port connecting a lower part of said storage space of said in-containment water storage tank with the space surrounding the storage tank; and a second check valve contained in said port and arranged for allowing water flow from the containment into said in-containment water storage tank if water level in the containment shell is higher than in said in-containment water storage tank.

13. A passive safety system as defined in claim 4, wherein said check valve is a first check valve; further comprising a second check valve contained in said fourth pipe and arranged for preventing fluid flow through said fourth pipe and said fifth pipe into said pressurizer.

14. In a nuclear reactor including a shield building, a heat-conducting containment shell situated in the shield building and defining an annular space therewith surrounding said containment shell, a reactor vessel situated in the containment shell, a steam generator situated in the containment shell, a reactor coolant circuit having a first branch guiding heated water from said reactor vessel into said steam generator and a second branch guiding cooled water from said steam generator into said reactor vessel; a reactor coolant pump connected to said reactor coolant circuit for maintaining circulation of water therein, and a pressurizer connected to said reactor coolant circuit for maintaining the water therein at predetermined pressures; said pressurizer having a steam space; the improvement comprising a passive safety system including
(a) first means for circulating water solely by natural convection from said first branch to said second branch with the circumvention of said steam generator for removing decay heat from said reactor coolant circuit at any pressure; said first means including
(1) a heat exchanger means for cooling water flowing from said first branch and prior to being introduced into said second branch and for releasing heat into the containment space surrounded by said containment shell;
(2) first valve means for allowing flow of water from said first branch into said second branch solely in response to a parameter value pertaining to operational safety;
(b) second means for introducing stored cold water solely by gravity into said reactor vessel for making up for lost water in said reactor coolant circuit at any pressure; said second means including
(1) a water storage tank holding cold water and having an upper part being in a continuous communication with said steam space of said pressurizer for maintaining said water storage tank continuously at the steam pressure of said steam space; and
(2) second valve means for allowing the stored cold water to be introduced into said reactor vessel solely in response to a parameter value pertaining to operational safety;
(c) third means for introducing stored cold water solely by gravity into said reactor vessel when the pressure within the reactor coolant circuit is reduced at least approximately to the same pressure as in the containment shell, for flooding the containment shell to a height above said first and second branches of said reactor coolant circuit; said third means including third valve means for depressurizing said reactor coolant circuit in response to a parameter value pertaining to operational safety; and
(d) fourth means for effectng a heat exchange contact in said annular space between a fluid and said containment shell to remove heat from said containment shell solely by natural circulation of said fluid.

15. In a nuclear reactor including a shield building, a heat-conducting containment shell situated in the shield building and defining an annular space therewith surrounding said containment shell, a reactor vessel situated in the containment shell, a steam generator situated in the containment shell, a reactor coolant circuit having a first branch guiding heated water from said reactor vessel into said steam generator and a second branch guiding cooled water from said steam generator into said reactor vessel; a reactor coolant pump connected to said reactor coolant circuit for maintaining circulation of water therein, and a pressurizer connected to said reactor coolant circuit for maintaining the water therein at predetermined pressures; the improvement comprising a passive safety system including (a) first means for circulating water solely by natural convection from said first branch to said second branch with the circumvention of said steam generator for removing decay heat from said reactor coolant circuit at any pressure; said first means including
  (1) a heat exchanger means for cooling water flowing from said first branch and prior to being introduced into said second branch and for releasing heat into the containment space surrounded by said containment shell;
  (2) first valve means for allowing flow of water from said first branch into said second branch solely in response to a parameter value pertaining to operational safety;
(b) second means for introducing stored cold water solely by gravity into said reactor vessel for making up for lost water in said reactor coolant circuit at any pressure; said second means including second valve means for allowing the stored cold water to be introduced into said reactor vessel solely in response to a parameter value pertaining to operational safety;
(c) third means for introducing stored cold water solely by gravity into said reactor vessel when the pressure within the reactor coolant circuit is reduced at least approximately to the same pressure as in the containment shell, for flooding the containment shell to a height above said first and second branches of said reactor coolant circuit; said third means including
  (1) a water storage tank situated in said containment shell and having a water holding capacity sufficient to flood the containment shell to a height above said first and second branches of said reactor coolant circuit; said water storage tank being upwardly open towards the containment space surrounded by said containment shell for continuously maintaining said water storage tank at containment pressure;
  (2) third valve means for depressurizing said reactor coolant circuit in response to a parameter value pertaining to operational safety for lowering the pressure in the reactor coolant circuit to the pressure prevailing in the containment for allowing flow of water from said water storage tank into the containment shell; and
(d) fourth means for effecting a heat exchange contact in said annular space between a fluid and said containment shell to remove heat from said containment shell solely by natural circulation of said fluid.

16. In a nuclear reactor including a shield building, a heat-conducting containment shell situated in the shield building and defining an annular space therewith surrounding said containment shell, a reactor vessel situated in the containment shell, a steam generator situated in the containment shell, a reactor coolant circuit having a first branch guiding heated water from said reactor vessel into said steam generator and a second branch guiding cooled water from said steam generator into said reactor vessel; a reactor coolant pump connected to said reactor coolant circuit for maintaining circulation of water therein, and a pressurizer connected to said reactor coolant circuit for maintaining the water therein at predetermined pressures; said pressurizer having a steam space; the improvement comprising a passive safety system including (a) first means for circulating water solely by natural convection from said first branch to said second branch with the circumvention of said steam generator for removing decay heat from said reactor coolant circuit at any pressure; said first means including
  (1) a heat exchange means for cooling water flowing from said first branch and prior to being introduced into said second branch; said heat exchanger means including
    (i) a water storage tank situated in said containment shell and holding cooling water; said water storage tank being upwardly open toward the containment space surrounded by said containment shell for allowing vapor and steam to freely rise from the water storage tank into the containment space; and
    (ii) a heat exchanger disposed in the water storage tank and being formed of a piping in which water from the reactor coolant circuit flows and which is contacted externally by the cooling water contained in the water storage tank;
  (2) first valve means for allowing flow of water from said first branch into said second branch solely in response to a parameter value pertaining to operational safety;
(b) second means for introducing stored cold water solely by gravity into said reactor vessel for making up for lost water in said reactor coolant circuit at any pressure; said second means including
  (1) a water storage tank holding cold water and having an upper part being in a continuous communication with said steam space of said pressurizer for maintaining said water storage tank of said second means continuously at the steam pressure of said steam space; and
  (2) second valve means for allowing the stored cold water to be introduced into said reactor vessel solely in response to a parameter value pertaining to operational safety;
(c) third means for introducing stored cold water solely by gravity into said reactor vessel when the pressure within the reactor coolant circuit is reduced at least approximately to the same pressure as in the containment shell, for flooding the containment shell to a height above said first and second branches of said reactor coolant circuit; said third means including
  (1) a water storage tank situated in said containment shell and having a water holding capacity sufficient to flood the containment shell to a height above said first and second branches of said reactor coolant circuit; said water storage tank of said third means being upwardly open towards the containment space surrounded by said containment shell for continuously maintaining said water storage tank of said third means at containment pressure;
  (2) third valve means for depressurizing said reactor coolant circuit in response to a parameter value pertaining to operational safety for lowering the pressure in the reactor coolant circuit to the pressure prevailing in the containment; and (d) fourth means for effecting a heat exchange contact in said annular space between a fluid and said containment shell to remove heat from said containment shell solely by natural circulation of said fluid.

17. A nuclear reactor as defined in claim 16, wherein the water storage tank of said first means and the water storage tank of said second means are together constituted by a sole water storage tank.

* * * * *